United States Patent
Green

[15] 3,636,860
[45] Jan. 25, 1972

[54] COOKING UTENSIL AND PROTECTIVE SUPPORT

[72] Inventor: Virginia L. Green, 2134 Watson, Detroit, Mich. 48207

[22] Filed: Feb. 3, 1970

[21] Appl. No.: 8,211

[52] U.S. Cl. ............................................99/410, 99/418
[51] Int. Cl. ..........................................A47j 27/10
[58] Field of Search.................99/410, 319, 325, 349, 355, 99/417; 126/169; 134/135; 220/17, 23, 23.83

[56] References Cited

UNITED STATES PATENTS

| 1,303,751 | 5/1919 | Wilson | 220/17 |
|---|---|---|---|
| 1,460,975 | 7/1923 | Miller et al. | 99/410 |
| 2,064,787 | 12/1936 | Ducker | 99/349 UX |
| 2,515,879 | 7/1950 | Korn | 99/325 X |
| 3,526,335 | 9/1970 | Swett et al. | 220/23.83 X |

Primary Examiner—William I. Price
Assistant Examiner—Arthur O. Henderson
Attorney—Robert K. Rhea

[57] ABSTRACT

An upwardly open cylindrical container is provided with a bottom wall spaced upwardly from the lowermost edge of its wall. A support, having an annular groove nesting the wall of the lower end portion of the container, shields the bottom thereof. An annular flange, forming the upward limit of the container, centrally supports a foraminated lid and hopper permitting the escape of steam and preventing fluid boilover.

4 Claims, 4 Drawing Figures

PATENTED JAN 25 1972  3,636,860
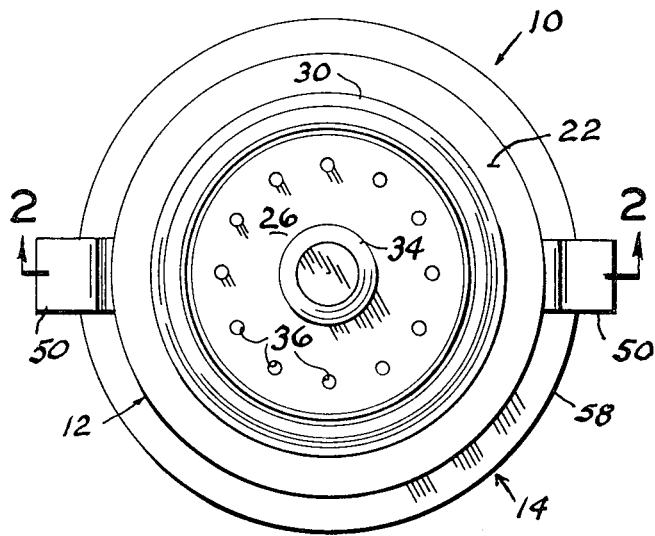
FIG. 1
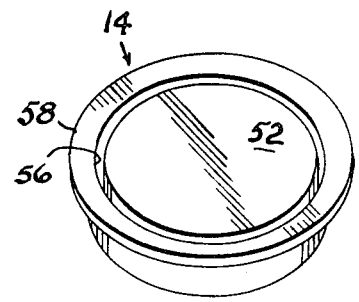
FIG. 3
FIG. 4
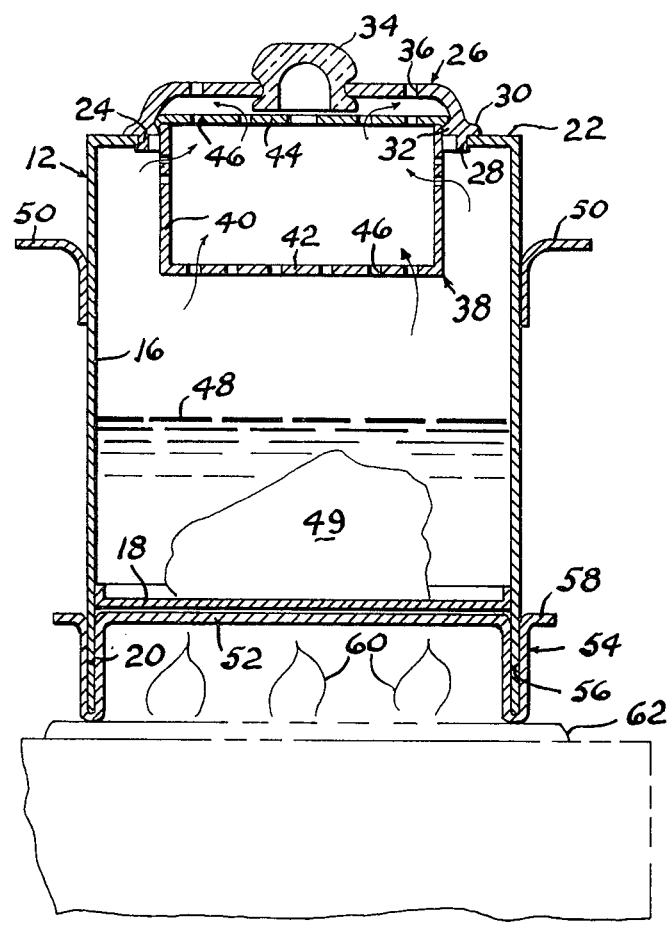
FIG. 2
VIRGINIA L. GREEN
INVENTOR.
BY
Robert K. Rhea
AGENT

COOKING UTENSIL AND PROTECTIVE SUPPORT

BACKGROUND OF THE INVENTION

1. Field of the Invention

The present invention relates to cooking utensils and more particularly to a container having a flame-protective supporting structure and a lid means preventing fluid boilover.

Cooking utensils are usually subjected to direct contact with the burner flame which, in many instances, results in smoking and discoloration of the utensil bottom particularly when the flame is turned too high as a result of an attempt to advance the cooking action by burning more fuel than the burner is regulated for. This blackening also occurs when the burner is improperly regulated for an efficient ration of gas-to-air by a burner. Needless to say blackened bottoms of cooking utensils are difficult to clean and results in an unsanitary and unkept appearance for the utensil.

It is, therefore, desirable that some means be provided for protecting the bottom portions of cooking utensils. Furthermore, cooking utensils containing fluids, as when boiling foodstuffs, tend to boil over and put out the flame when the flame is too high thus creating a safety hazard and necessitating cleaning of the burner and stove.

2. Description of the Prior Art

U.S. Pat. Nos. 2,307,408 and 3,237,549 disclose article-containing receptacles removably received by a fluid-containing outer receptacle.

SUMMARY OF THE INVENTION

An upright utensil having a cylindrical wall is provided with a bottom wall spaced upwardly from its depending edge. An inwardly directed annular flange defines a top opening normally closed by an apertured lid. A basketlike hopper, having a foraminated wall, is supported by the lid at the upper limit of the container. A protective support diametrically greater than the container underlies the bottom end thereof. The protective cover is provided with an annular ring forming a depending groove surrounding the depending cylindrical wall of the utensil below its bottom for shielding the bottom wall from direct contact with the burner flame.

The principal object of this invention is to provide a cooking utensil having a removable flame protective cover and means for preventing fluid boilover.

BRIEF DESCRIPTION OF THE DRAWINGS

FIG. 1 is a top view of the utensil in operative position;

FIG. 2 is a vertical cross-sectional view taken substantially along the line 2—2 of FIG. 1;

FIG. 3 is a perspective view of the bottom protective support, per se; and

FIG. 4 is a perspective view of the bottom support when inverted.

DESCRIPTION OF THE PREFERRED EMBODIMENT

Like characters of reference designate like parts in those figures of the drawings in which they occur.

In the drawing:

The reference numeral 10 indicates the device, as a whole, which is cylindrical in general configuration comprising a container 12 and a protective bottom cover or supporting structure 14. The container 12 is formed by a cylindrical wall 16 having a bottom wall 18 joined to the inner surface of the cylindrical wall 16 is spaced relation with respect to the depending edge surface of the cylindrical wall thus forming an annular depending flange 20. The upper limit of the wall 16 is provided with an annular inwardly extending flange 22 defining a top opening 24 for the container. The top opening 24 is closed by a lid 26 preferably formed of resilient material having a depending edge portion characterized by an annular depending wall 28 closely received by the inwardly directed edge of the flange 22 and having oppositely directed horizontal lips 30 and 32. The lip 30 overlies the upper inner edge surface of the flange 22 to support the lid 26 in sealing relation with respect to the flange 22. The lid 26 is centrally apertured and provided with a buttonlike knob forming a handle 34 for lifting the lid. The lid is preferably apertured, as at 36, for permitting escape of vapors.

The lid lip 32 supports a cylindrical basketlike hopper 38 preferably formed of metallic material having a cylindrical wall 40, a bottom wall 42 and a top wall 44. The top wall 44 overlies the horizontal plane of the hopper wall 40 and is supported by the lip 32. The hopper wall 40, bottom 42 and top wall 44 are each provided with a plurality of apertures or openings 46. The purpose of the hopper having openings 46 is to permit fluid, indicated at 48, as when boiling foodstuff 49 to contact the hopper and enter it through the openings 46 so that the boiling action is dampened and steam generated may escape through the hopper top wall openings 46 and lid apertures 36. The container is preferably provided with outstanding handles 50 connected with the cylindrical wall 16.

The supporting structure 14 is preferably formed from a single sheet of selected material which may be deformed to the configuration shown or may be cast or molded if desired. The support 14 comprises a horizontal flat central or plate portion 52 which underlies, in close spaced relation, the container or utensil bottom 18. A generally U-shaped annular wall or ring 54 integrally connected, by its innermost leg, with the flat portion 52, depends therefrom forming an upwardly open annular recess or socket 56 dimensioned substantially deeper than its transverse width for cooperative reception of the utensil depending flange 20. The outermost leg of the U-shaped wall terminates in an outstanding horizontal flange 58 lying in the plane of the plate portion 52. The transverse width of the socket 56 is such that the utensil flange 20 may be easily lifted thereoutof. Thus, the protective support structure 14 shields the depending end portion of the utensil from contact with flames 60 generated by a burner 62.

Obviously the invention is susceptible to changes or alterations without defeating its practicability, therefore, I do not wish to be confined to the preferred embodiment shown in the drawings and described herein.

I claim:

1. A combined cooking utensil and protective cover, comprising:
   an open-topped receptacle characterized by a bottom wall spaced upwardly from its lowermost limit defining an angular depending flange;
   a lid for the open top; and
   a supporting structure underlying and surrounding the bottom portion of said receptacle,
   said supporting structure including an annular ring U-shaped in cross section forming an annular socket freely receiving the depending flange and supporting the bottom of said receptacle.

2. Structure as specified in claim 1 in which said supporting structure further includes:
   a plate portion connected with said U-shaped annular ring and underlying said bottom wall.

3. Structure as specified in claim 2 in which said supporting structure further includes:
   an outstanding annular flange horizontally connected with said U-shaped ring opposite and in the plane of said plate.

4. Structure as specified in claim 3 and further including:
   a basket having a foraminated wall supported within said receptacle by said lid for dampening the action of boiling fluids contained by said receptacle and permitting passage of vapor.

* * * * *